(Model.)
J. LOCKE.
GLASSWARE.
No. 282,002. Patented July 24, 1883.
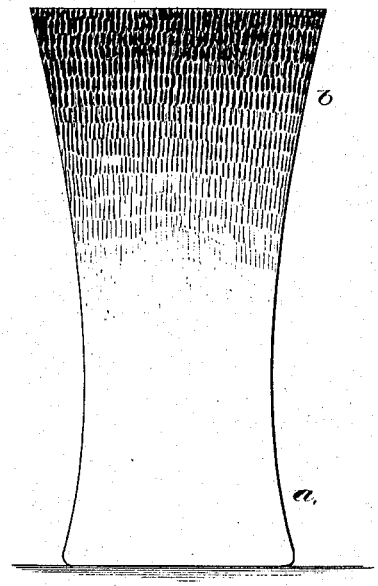
Witnesses:
John F. C. Brinkerh
Fred A. Powell.
Inventor:
Joseph Locke
by Crosby Gregory attys

UNITED STATES PATENT OFFICE.

JOSEPH LOCKE, OF SOMERVILLE, ASSIGNOR TO WM. L. LIBBEY, OF NEWTON, AND EDWARD D. LIBBEY, OF BOSTON, MASSACHUSETTS.

GLASSWARE.

SPECIFICATION forming part of Letters Patent No. 282,002, dated July 24, 1883.

Application filed June 21, 1883. (Model.)

*To all whom it may concern:*

Be it known that I, JOSEPH LOCKE, of Somerville, county of Middlesex, State of Massachusetts, have invented an Improvement in Glassware, of which the following description, in connection with the accompanying drawing, is a specification, like letters on the drawing representing like parts.

This invention has for its object the production of a novel class of glassware as a new article of manufacture, the glassware being composed of homogeneous stock, having different or contrasting colors blended or merged one into the other, as will be described.

Articles of glassware presenting different colors, as now commonly made, are either composed of a body of one class or color of glass plated or veneered with glass of a different color or kind, or of glass of different colors, or materials mixed and melted, the different colors or kinds showing more or less distinctly in the product, or of pieces of different colored glass incorporated with glass just removed from the pot and yet plastic; but neither of these classes of glass are of homogeneous or of like stock throughout.

In accordance with my invention the article of glassware showing different colors is all of one kind of glass, or the glass for the production of the entire article is all the result of the same mixture and is taken from the same pot or crucible, the change in color being produced entirely in the manufacture of the ware by the action upon it of varying degrees of heat, as will be described.

The drawing shows a piece of glassware embodying my invention.

To produce glass in accordance with my invention, I take what is known to skilled glass-makers as an "amber-glass mixture," or one containing the metal gold, and as commonly used for making ruby glass, and, having melted the said mixture in a pot in an ordinary furnace, thus forming of it amber glass, the latter is gathered on a blow-iron or "punty" and taken from the pot in usual manner, and is blown, molded, or pressed, or fashioned into the shape it is desired that the article of glassware to be produced shall have, the article being gradually shaped as commonly done, and as is well understood by glass-makers.

The change of color in the article is gradually effected during the operation of making and shaping the same by cooling the article more or less, and then reheating different portions of the same to different degrees, or by subjecting more or less of the said article to the action of heat issuing from the usual "glory-hole," or from a pot-hole—such as commonly found in glass-works—or other modes of heating the article may be resorted to.

When heating the article at the glory-hole, it will be moved toward and from the mouth of the same; or it may be from the pot-hole, to permit the heat and gases to act upon such parts of the article upon which the color is to be developed, the developed color being different from that of the natural color of the homogeneous base or stock; or, in other words, I expose more or less of the article to heat of greater or less intensity, and for a longer or shorter period, according to the color it is desired to develop or the contrast which it is desired to produce in different portions of the article, all parts of which are of uniform texture or material, or, as I have said, stock.

During the formation of glassware for table use, vases, &c., in accordance with my invention, I permit one end or portion of the article being made from amber glass, as described, to become more or less cool, and to develop a ruby color more or less dense on but a portion of the article, and cause the developed colors to blend or gradually merge into other colors common to amber glass. I reheat such portions of the article which are to show the developed color to contrast with the part not so heated, and in so doing parts of the article are reheated to a greater or less degree, preferably continuing to revolve the same by a suitable iron attached to the article being made, the developed color being at one or the other end of the article, according to which end thereof the said iron is attached, the action of the heat or flame issuing from the glory-hole, or from other suitable source of heat, against the article resulting in the production of an article of glassware showing different colors blended one into the other, the ruby or other colors developed from the amber glass being made more or less deep, according to the duration of the furnace heat, the color differing from that of the original color of the glass when first removed from the furnace, being extended more or less throughout the entire article according as more or less of the said article is subjected to the action of the heat or gases, as stated.

Starting with amber glass as a base, I have been enabled by the action of heat alone to develop on a part of the article composed of homogeneous stock a more or less deep ruby color, and also develop in the said article a violet shade, and greenish, and a blueish, and other tinges.

In the drawing, representing a champagne-tumbler of amber glass, the lower end, marked $a$, is supposed to be of amber color, but its upper portion, $b$, shown by darker color, is supposed to be of a developed or ruby color, a darker color than that shown by portion $a$.

I have described an amber-glass mixture, containing gold, as the one from which I have obtained beautiful results; but I desire to be understood that other metals and substances employed to give color to glass compounds may be found to produce a glass which, when subjected to heat, as described, will show developed colors differing from those produced with amber glass, and different effects in color will be noticeable according to whether the gold is pure or contains an alloy.

I claim—

1. As a new article of manufacture, glassware composed of homogeneous stock, presenting different colors blended into each other, as shown and described.

2. That improvement in the art or method of manufacturing articles of glass of homogeneous stock, and producing therein different colors, which consists in cooling the article and reheating parts of the same unequally, thereby producing the variations in color, as stated.

In testimony whereof I have signed my name to this specification in the presence of two subscribing witnesses.

JOSEPH LOCKE.

Witnesses:
  G. W. GREGORY,
  FRED A. POWELL.